(12) United States Patent
Droche

(10) Patent No.: US 7,735,928 B2
(45) Date of Patent: Jun. 15, 2010

(54) HEAD-REST FOR A SEAT BACK-REST, IN PARTICULAR FOR A VEHICLE SEAT BACK-REST

(75) Inventor: Emile Droche, La Garenne Colombes (FR)

(73) Assignee: I.T.W. de France, Beauchamp (FR)

( * ) Notice: Subject to any disclaimer, the term of this patent is extended or adjusted under 35 U.S.C. 154(b) by 628 days.

(21) Appl. No.: 11/338,820

(22) Filed: Jan. 25, 2006

(65) Prior Publication Data

US 2006/0163928 A1    Jul. 27, 2006

(30) Foreign Application Priority Data

Jan. 26, 2005    (FR) .................................. 05 00792

(51) Int. Cl.
*B60N 2/48* (2006.01)
(52) U.S. Cl. .................. 297/404; 297/216.12; 297/391; 297/452.18
(58) Field of Classification Search ............ 297/216.12, 297/391, 404, 406, 407, 410, 452.18, 452.2
See application file for complete search history.

(56) References Cited

U.S. PATENT DOCUMENTS

| 4,840,428 | A | * | 6/1989 | Kobayashi et al. | .......... 297/408 |
|---|---|---|---|---|---|
| 4,989,836 | A | * | 2/1991 | Hudson et al. | .............. 297/391 |
| 4,991,907 | A | * | 2/1991 | Tanaka | ....................... 297/408 |
| 5,895,094 | A | * | 4/1999 | Mori et al. | .................. 297/410 |
| 5,927,814 | A | * | 7/1999 | Yoshimura | ................... 297/391 |
| 6,019,273 | A | * | 2/2000 | Garnweidner | ............... 228/144 |
| 6,022,078 | A | | 2/2000 | Chang | |
| 6,224,158 | B1 | * | 5/2001 | Hann | ......................... 297/391 |
| 6,631,956 | B2 | * | 10/2003 | Mauro et al. | ................. 297/410 |
| 6,883,870 | B2 | * | 4/2005 | Jost | ............................. 297/391 |
| 2003/0001413 | A1 | * | 1/2003 | Albrecht | ................. 297/216.12 |
| 2007/0035163 | A1 | * | 2/2007 | Andrews | ............... 297/216.12 |

FOREIGN PATENT DOCUMENTS

| DE | 197 12 663 A1 | 1/1998 |
|---|---|---|
| FR | 2 755 915 A1 | 5/1998 |

\* cited by examiner

*Primary Examiner*—Peter R. Brown
(74) *Attorney, Agent, or Firm*—Lowe Hauptman Ham & Berner LLP

(57) ABSTRACT

The head-rest for a seat includes an inverted U-shaped frame including two vertical branches and a horizontal branch. The horizontal branch includes two rigid sections connected together by a flexible material to allow a longitudinal, angular and/or alignment offset.

14 Claims, 3 Drawing Sheets

HEAD-REST FOR A SEAT BACK-REST, IN PARTICULAR FOR A VEHICLE SEAT BACK-REST

RELATED APPLICATIONS

The present application is based on, and claims priority from, French Application Number 0500792, filed Jan. 26, 2005, the disclosure of which is hereby incorporated by reference herein in its entirety.

The invention generally relates to head-rests for seats, in particular vehicle seats.

Head-rests are known which include an inverted U-shaped frame and a cushion which covers the horizontal branch and a portion of the vertical branches adjacent the horizontal branch.

A head-rest is known from the document FR 2 755 915 in which the portion of each vertical branch which is not covered by the cushion forms a foot provided to be inserted to a greater or lesser extent into receiving means of the back-rest of the seat.

The receiving means are rigidly fixed into the framework of the back-rest of the seat and include two sockets adapted to receive the feet of the frame. Given manufacturing tolerances, the separation of the sockets in the seat does not always perfectly correspond to that of the vertical branches of the head-rest. Furthermore, the sockets are not always parallel to each other, and the vertical branches are not always parallel to each other. In such a case, it is necessary to insert the feet of the head-rest by force into the sleeves comprised by the sockets.

The object of the invention is to provide a head-rest making it possible to compensate for the aforementioned defects, and remaining sufficiently strong to conform to regulations, while being particularly simple, convenient and economic to produce.

To that end, the invention provides a head-rest for a seat, in particular a vehicle seat, including an inverted U-shaped frame including two vertical branches and a horizontal branch, the head-rest further including a cushion covering the horizontal branch and covering a portion of each vertical branch of the frame adjacent the horizontal branch, characterized in that said horizontal branch includes two rigid sections connected together by a flexible material to allow a longitudinal, angular and/or alignment offset.

Thus, the separation of the vertical branches adapts to the separation of the sockets in which they are inserted. Moreover, the axis of each vertical branch aligns itself with that of the corresponding socket, independently of the other branch. Despite manufacturing tolerances, the head-rest is easily inserted in the sockets.

According to features of implementation that are particularly simple and convenient both with respect to manufacture and use:

each section includes an end portion, the end portion of one of said sections accommodating the end portion of the other of said sections; and possibly said flexible material is molded over an end portion of each said section, these end portions each having an end with a wall, these walls facing each other and being oriented transversely to the axis of said horizontal branch; and possibly said flexible material covers said walls and fills the space delimited by those walls; and/or each section has a has a U-shaped profile; or said sections each include an end portion, those end portions having complementary shapes, one of said end portions including a cylindrical finger and the other of said end portions having a cylindrical bore adapted to accommodate said finger with radial clearance; and possibly said flexible material is a sleeve molded onto an end portion of each said section; and/or said flexible material is an elastomer; and/or each vertical branch includes a metal reinforcement; and possibly each vertical branch includes a rigid plastic material carcass molded onto said respective metal reinforcement; and possibly each section of the horizontal branch is connected, at its end remote from the adjacent section, and substantially perpendicularly, to a respective carcass, each section being molded in one piece with a respective carcass; and/or each vertical branch has, in the branch portion not covered by the cushion, a foot adapted to be inserted to a greater or lesser extent into receiving means of the back-rest of said seat, each foot including notches formed in the thickness of the carcass for adjusting the height of the head-rest; and/or each metal reinforcement of the vertical branches is smooth and of circular cross section.

The features and advantages of the invention will appear from the following description, given by way of preferred but non-limiting example, with reference to the accompanying drawings in which.

Figure 1:
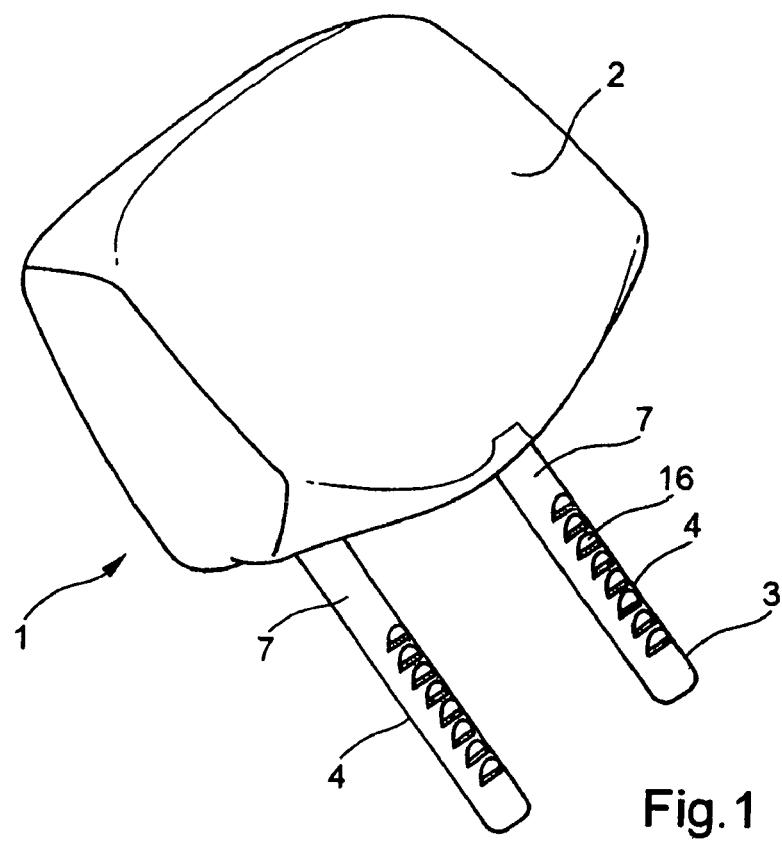
FIG. 1 is a schematic perspective view of a head-rest according to the invention.
Figure 2:
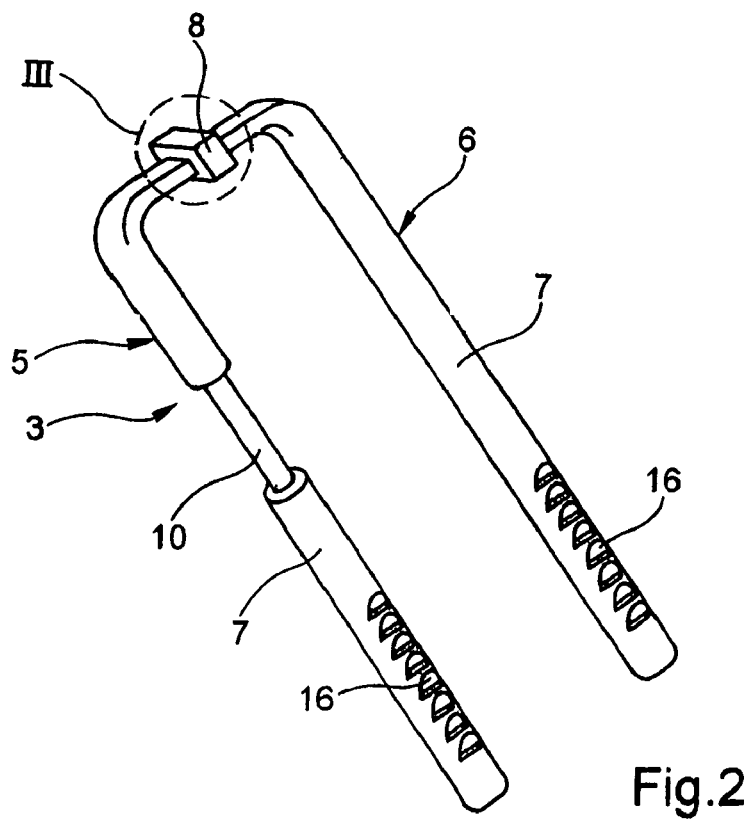
FIG. 2 is a schematic perspective view of the frame of that head-rest with a carcass shown partially cut away to reveal a metal reinforcement.
Figure 3:
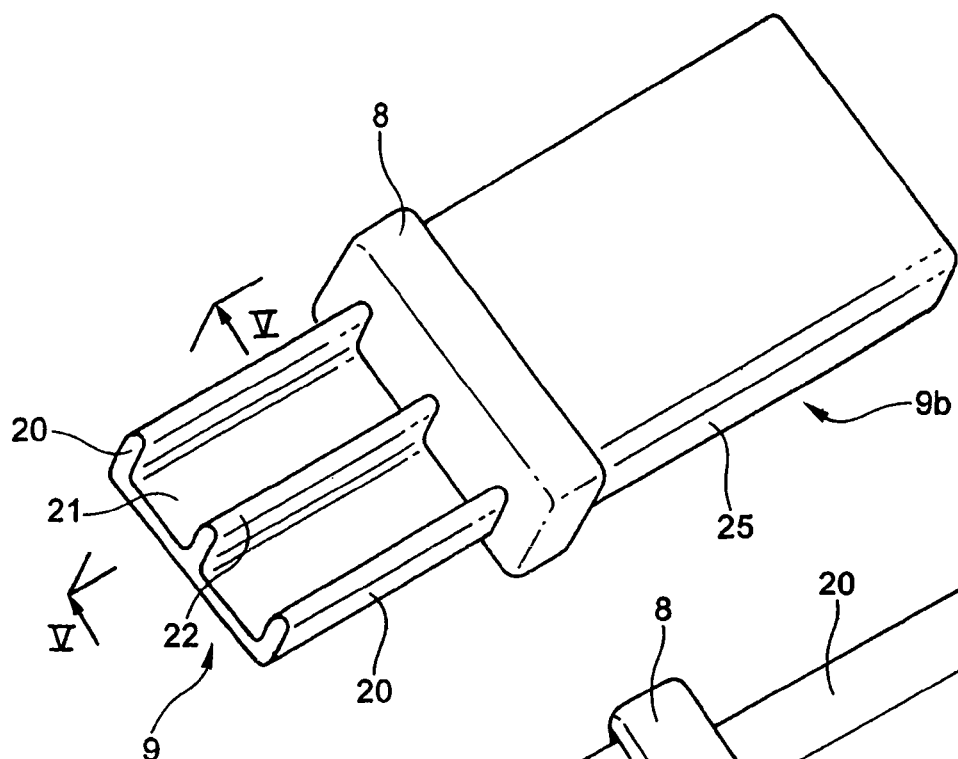
FIG. 3 is an enlarged view of detail III of FIG. 2.
Figure 4:
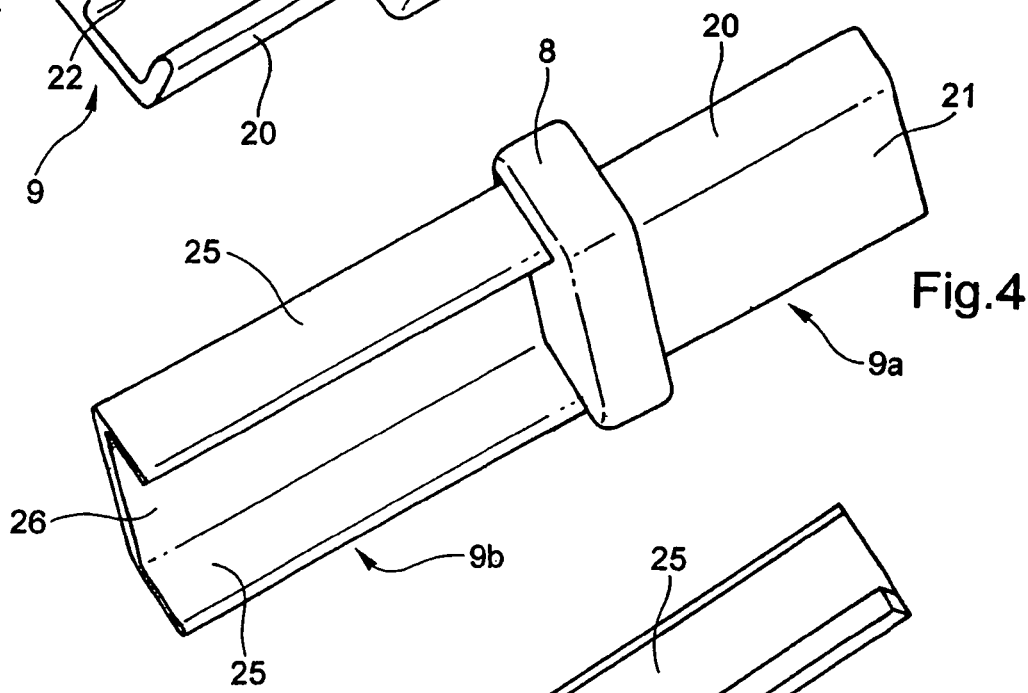
FIG. 4 is a view similar to that of FIG. 3, from another viewing angle.
Figure 5:
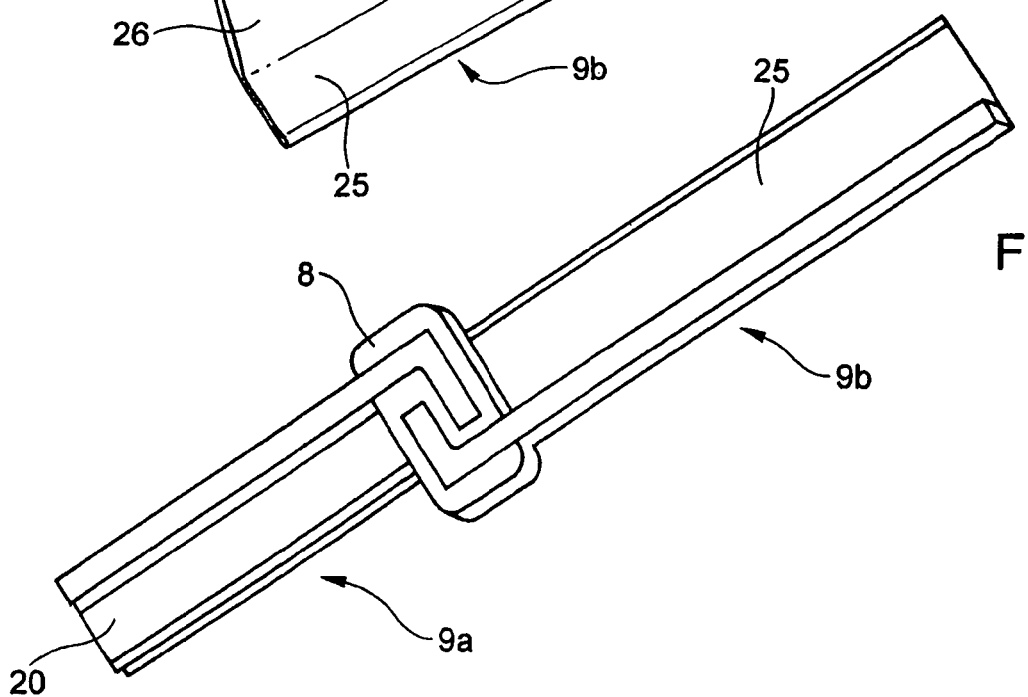
FIG. 5 is a section view on the plane referenced V-V in FIG. 3.

Head-rest 1 illustrated in FIG. 1 includes a cushion 2 and a frame 3. As can be seen in FIG. 2, the frame 3 is of inverted U-shape.

The frame 3 includes two vertical branches and a horizontal branch. Frame 3 is formed from two L-shaped rods 5, 6 jointed at one of their ends and which are adapted to cooperate with each other with the help of a covering 8 of flexible material.

The frame 3 is of rigid plastics material whereas the covering 8 is of elastomer.

Each vertical branch includes a metal reinforcement 10. Around each metal reinforcement 10 a cylindrical carcass 7 is molded which forms part of the frame 3. The metal reinforcements 10 are straight, smooth and of circular cross-section.

The horizontal branch is formed of two sections 9 of rod 5, 6 each connecting at one end to one of the carcasses 7 molded as a single piece with the adjacent section 9.

The length of section 9 is less than that of carcass 7. The corner formed between section 9 and carcass 7 at their junction is rounded here.

The portion of the vertical branch remote from the end connected to section 9, is a foot 4 adapted to be inserted in the sleeves comprised by the receiving sockets of the back-rest of the seat (not shown).

Each section 9 has a free end portion remote from the end connected to the carcass 7. The two sections 9 have complementary forms at that end portion.

The first section 9a is a member of U-section. It includes two side walls 20, extending along the parallel edges of a main wall 21. These walls 20 are of a height much less than the width of the main wall 21. A rib 22 extends parallel to the walls 20, midway between them. Rib 22 and walls 20 extend on the same side of the wall 21.

Figure 7:
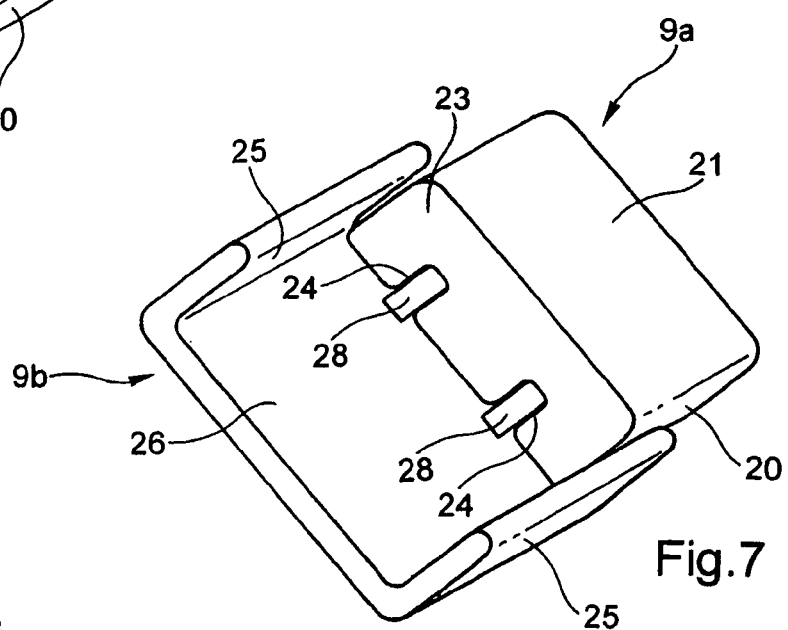

As can be seen in FIG. 7, at its end remote from the end connected to carcass 7, section 9a includes a wall 23 which extends transversely to the general direction of the section 9a. Wall 23 extends from one wall 20 to the other. Walls 20, 23 and rib 22 all have the same height.

Wall 23 includes two identical cut-outs 24, that are substantially rectangular and spaced apart from each other. They extend from an edge on the opposite side from wall 21.

The second section 9b is also a member of U-section with two side walls 25 and a main wall 26. The dimensions of the walls 25, 26 are provided such that section 9a is able to slide, here with clearance, in the space delimited by the walls 25, 26 of section 9b.

Figure 6:
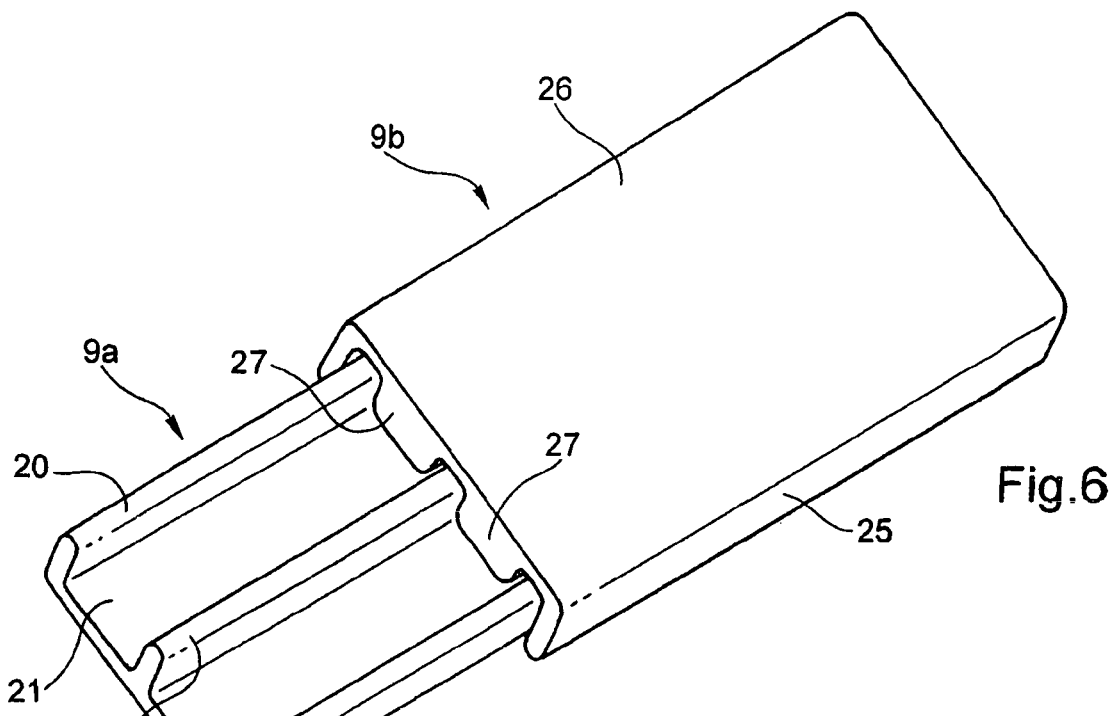
FIGS. 6 and 7 are partial views of the sections of the horizontal branch without the covering, from two different viewing angles.

As can be seen in FIG. 6, at one of its ends, section 9b includes two tabs 27 which extend transversely to the general direction of section 9b. Tabs 27 are spaced apart from each other and from the walls 25. The dimensions and position of each tab 27 are provided to give a form that is complementary to that of the cross-section of the first section 9a.

Section 9b further includes two triangular reinforcing ribs 28. Each rib 28 stems from a surface of one tab 27 and extends to the adjacent surface of the main wall 26 so as to reinforce tab 27. Ribs 28 are centered with respect to tabs 27.

When sections 9a, 9b cooperate, their end portions overlap. At one of these end portions, the main walls 21, 26, and respectively the walls 20, 25, face each other and are spaced apart from each other.

Ribs 28 are straddled by the cut-outs 24 whereas the tabs 27 are interposed between the walls 20 and the rib 22.

Covering 8 covers the end portions which overlap and fill all the interior spaces. Plastics material is thus present between the wall 23 and the tabs 27. The covering 8 is notched due to rib 22 and ribs 28 such that it adheres well to sections 9a, 9b.

As covering 8 is an elastomer, it is elastically deformable.

By virtue of covering 8, the two rods 5, 6 are fixed to each other. Covering 8 is sufficiently deformable to allow relative longitudinal movement of the sections of the horizontal branch. It thus permits an alignment offset during which the axes of sections 9a, 9b are no longer aligned and a slight angular offset of one section with respect to the other.

The horizontal branch thus has the possibility of extension, shortening or twisting, the presence of the covering 8 limiting the amplitude of the movement.

The two vertical branches may thus be spaced apart from each other to a greater or lesser extent and have an angular position that is different to a greater or lesser extent than that in which they are parallel to each other. They may assume a position with respect to each other which is optimally adjusted to the position of the receiving sockets of the back-rest of the seat.

While providing a certain degree of flexibility to the frame 3, covering 8 ensures the continuity of that frame 3 and ensures that the two rods 5, 6 do not disengage from each other. This enables good resistance to impacts, covering 8 being able to absorb a possible impact of the head on the head-rest.

Head-rest 1 further includes cushion 2. This covers a portion of the frame 3 revealing of the vertical branches only the two feet 4 provided to be inserted each to a greater or lesser extent in a sleeve comprised by a receiving socket of the back-rest of the seat for which the head-rest 1 is provided.

Each foot 4 is provided with a series of notches 16 formed in the carcass 7. Each sleeve includes a latch adapted to cooperate with one of the notches 16 of the foot 4 to hold the head-rest 1 in position. The cooperation of the notches 16 and the latch enables the height of the head-rest to be adjusted.

Figure 8:
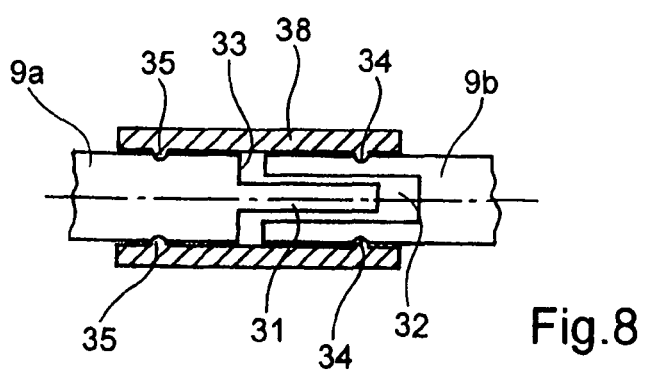
FIG. 8 is a partial cross-section view of a variant of the embodiment of FIGS. 1 to 7 in which the end portions of the sections of the horizontal branch are a finger and a cylindrical bore.

In FIG. 8, a variant of the preceding embodiment has been shown in which the only differences are the end portions of the sections 9a, 9b.

Section 9a includes a male member 31 and section 9b a female member 32. Male member 31 is a solid finger having the same axis as section 9a and of which the diameter is less than that of section 9a. This section 9a has a shoulder 33 at the base of the male member 31.

The female member 32 of section 9b is a bore having the same axis as that of section 9a and being of greater diameter than that of the male member 31 such that the two members 31, 32 can cooperate interfittingly with each other, with radial clearance.

The length of the male member 31 is less than that of the female member 32.

Sections 9a, 9b further include an outer annular groove 34 situated for each section 9a, 9b at the same distance from their end. This distance is here less than the length of the female member 32.

The covering is a sleeve 38 molded onto the end portions of the sections 9a, 9b, the members 31, 32 being in a position fitted one into the other in which the finger 31 is not fully inserted in the bore 32. Sleeve 38 is cylindrical and extends over the sections 9a, 9b beyond each groove 34.

In the inside face in contact with sections 9a, 9b, sleeve 38 has two annular ribs 35 of small thickness which each cooperate with a groove 34. The rib 35/groove 34 cooperation assists in holding the components of the assembly that includes sleeve 38 and sections 9a, 9b.

When sections 9a, 9b corporate via members 31, 32 and when sleeve 38 also connects sections 9a, 9b, the end of section 9a is spaced apart from shoulder 33.

Thus it is possible for sections 9a, 9b to have a longitudinal offset and an angular and alignment offset, elastomer sleeve 38 limiting the amplitude of movement.

According to another variant, the covering extends further along the sections of the horizontal branch.

The present invention is not limited to the embodiment described and represented but covers any variant form.

The invention claimed is:

1. A head-rest for a seat comprising:
   an inverted U-shaped frame including two vertical branches connected with a horizontal branch; and
   a cushion covering the horizontal branch and a portion of each said vertical branch of the frame adjacent the horizontal branch;
   wherein said horizontal branch comprises first and second sections connected to each other by a flexible member to allow an angular and/or alignment offset in a longitudinal direction of said horizontal branch,
   wherein
   said first section includes a first wall located at an end of the first section, and said second section includes a second wall located at an end of the second section, said first and second walls facing each other and extending along a transverse direction perpendicular to the longitudinal direction of said horizontal branch.

2. The head-rest according to claim 1, wherein said end of the first section is interconnected with the end of the second section by said flexible member.

3. The head-rest according to claim 1, wherein said flexible member covers said first and second walls and a space between said first and second walls.

4. The head-rest according to claim 1, wherein each said section comprises a U-shaped profile.

5. The head-rest according to claim 1, wherein said flexible member is an elastomer.

6. The head-rest according to claim 1, wherein said each vertical branch comprises a metal reinforcement.

7. The head-rest according to claim 6, wherein said each vertical branch comprises a rigid member surrounding said metal reinforcement, respectively.

8. The head-rest according to claim 7, wherein said each section of the horizontal branch further comprises a free end portion connected, perpendicularly and integrally, to said rigid member.

9. The head-rest according to claim 7, wherein said each vertical branch comprises a foot adapted to be inserted to a receiving of said seat, each foot comprising notches configured in a thickness of said member to adjust a height of the head-rest.

10. The head-rest according to claim 6, wherein said each metal reinforcement comprises a circular cross section.

11. The head-rest according to claim 1, wherein said first section further comprises
a main wall extending in the longitudinal direction of said horizontal branch and perpendicularly to the first wall;
side walls extending along edges of said main wall in the longitudinal direction of said horizontal branch; and
a rib extending between said side walls in the longitudinal direction of said horizontal branch.

12. The head-rest according to claim 11, wherein said second section comprises
at least a tab defined by said second wall at the end of the second section,
wherein said tab is interposed between the adjacent side walls of the first section in the transverse direction of the horizontal branch.

13. A head-rest for a seat comprising:
an inverted U-shaped frame including two vertical branches connected with a horizontal branch; and
a cushion covering the horizontal branch and a portion of each said vertical branch of the frame adjacent the horizontal branch;
wherein said horizontal branch comprises first and second sections connected to each other by a flexible member to allow an angular and/or alignment offset in a longitudinal direction of said horizontal branch,
wherein said first section includes an end portion engageable with an end portion of the second section by said flexible member; and
said flexible member is molded over the end portions which have end walls, respectively, and
the end walls face each other and extend along a transverse direction perpendicular to the longitudinal direction of said horizontal branch.

14. A head-rest for a seat comprising:
an inverted U-shaped frame including two vertical branches connected with a horizontal branch; and
a cushion covering the horizontal branch and a portion of each said vertical branch of the frame adjacent the horizontal branch;
wherein said horizontal branch comprises first and second sections connected to each other by a flexible member to allow an angular and/or alignment offset in a longitudinal direction of said horizontal branch and to prevent said two vertical branches from disengaging from each other,
wherein
said first section includes a first wall located at an end of the first section, and said second section includes a second wall located at an end of the second section, said first and second walls facing each other and extending along a transverse direction of said horizontal branch.

* * * * *